US012681525B2

(12) United States Patent
Abadi et al.

(10) Patent No.: US 12,681,525 B2
(45) Date of Patent: Jul. 14, 2026

(54) CLOCK-TO-DATA SYNCHRONIZATION

(71) Applicant: NVIDIA Corporation, Santa Clara, CA (US)

(72) Inventors: Ofek Abadi, Nahariya (IL); Omer Wolkovitz, Kfar Saba (IL)

(73) Assignee: NVIDIA Corporation, Santa Clara, CA (US)

( * ) Notice: Subject to any disclaimer, the term of this patent is extended or adjusted under 35 U.S.C. 154(b) by 64 days.

(21) Appl. No.: 18/746,983

(22) Filed: Jun. 18, 2024

(65) Prior Publication Data

US 2025/0383684 A1      Dec. 18, 2025

(51) Int. Cl.
| | |
|---|---|
| *G06F 1/12* | (2006.01) |
| *G06F 1/10* | (2006.01) |
| *G06F 13/16* | (2006.01) |
| *G06F 13/42* | (2006.01) |

(52) U.S. Cl.
CPC ............ *G06F 1/12* (2013.01); *G06F 13/1689* (2013.01); *G06F 1/10* (2013.01); *G06F 13/4217* (2013.01); *G06F 13/423* (2013.01); *G06F 13/4243* (2013.01); *G06F 13/4291* (2013.01)

(58) Field of Classification Search
CPC .......... G06F 1/12; G06F 1/10; G06F 13/1689; G06F 13/423; G06F 13/4243; G06F 13/4291; G06F 13/4217
USPC ................................... 713/400, 503; 710/61
See application file for complete search history.

(56) References Cited

U.S. PATENT DOCUMENTS

| | | | | |
|---|---|---|---|---|
| 7,376,855 B1 * | 5/2008 | Gauthier | ................. | H04L 7/005 |
| | | | | 713/400 |
| 9,843,315 B2 * | 12/2017 | Ware | .................... | G11C 29/028 |
| 2004/0124929 A1 * | 7/2004 | Ishiwaki | ................. | H03L 7/089 |
| | | | | 331/1 R |
| 2005/0259726 A1 * | 11/2005 | Farjad-Rad | ....... | H04L 25/03159 |
| | | | | 375/232 |
| 2006/0190756 A1 * | 8/2006 | Okamura | .................. | H03L 7/07 |
| | | | | 713/503 |
| 2009/0285042 A1 * | 11/2009 | Chae | .................... | G11C 7/1093 |
| | | | | 365/194 |
| 2017/0237419 A1 * | 8/2017 | Clara | ....................... | H03K 5/13 |
| | | | | 327/231 |
| 2018/0321705 A1 * | 11/2018 | Koshisaka | ................ | H04L 7/06 |

OTHER PUBLICATIONS

Nishi et al., "A 0.190-pJ/bit 25.2-GB/s/wire Inverter-Based AC-Coupled Transceiver for Short-Reach Die-to-Die Interfaces in 5-nm CMOS," 2023 Symposium on VLSI Technology and Circuits Digest of Technical Papers, 2023, 2 pages.

* cited by examiner

*Primary Examiner* — Ji H Bae
(74) *Attorney, Agent, or Firm* — Lowenstein Sandler LLP

(57) ABSTRACT

Technology related to calibrating synchronization of a data signal to a forwarded clock signal is described. A circuit includes a receiver circuit and a clock-to-data synchronization circuit. The receiver circuit receives a data signal and includes two inverters and two resistors. The clock-to-data synchronization circuit receives the data signal and the clock signal and determines an indication of synchronization between the data and clock signals. The clock-to-data synchronization circuit adjusts, using the indication, a parameter of the receiver circuit to synchronize the data signal and the clock signal.

20 Claims, 10 Drawing Sheets

312

CKRinp

CKRinn clk_level_high clk_level_low

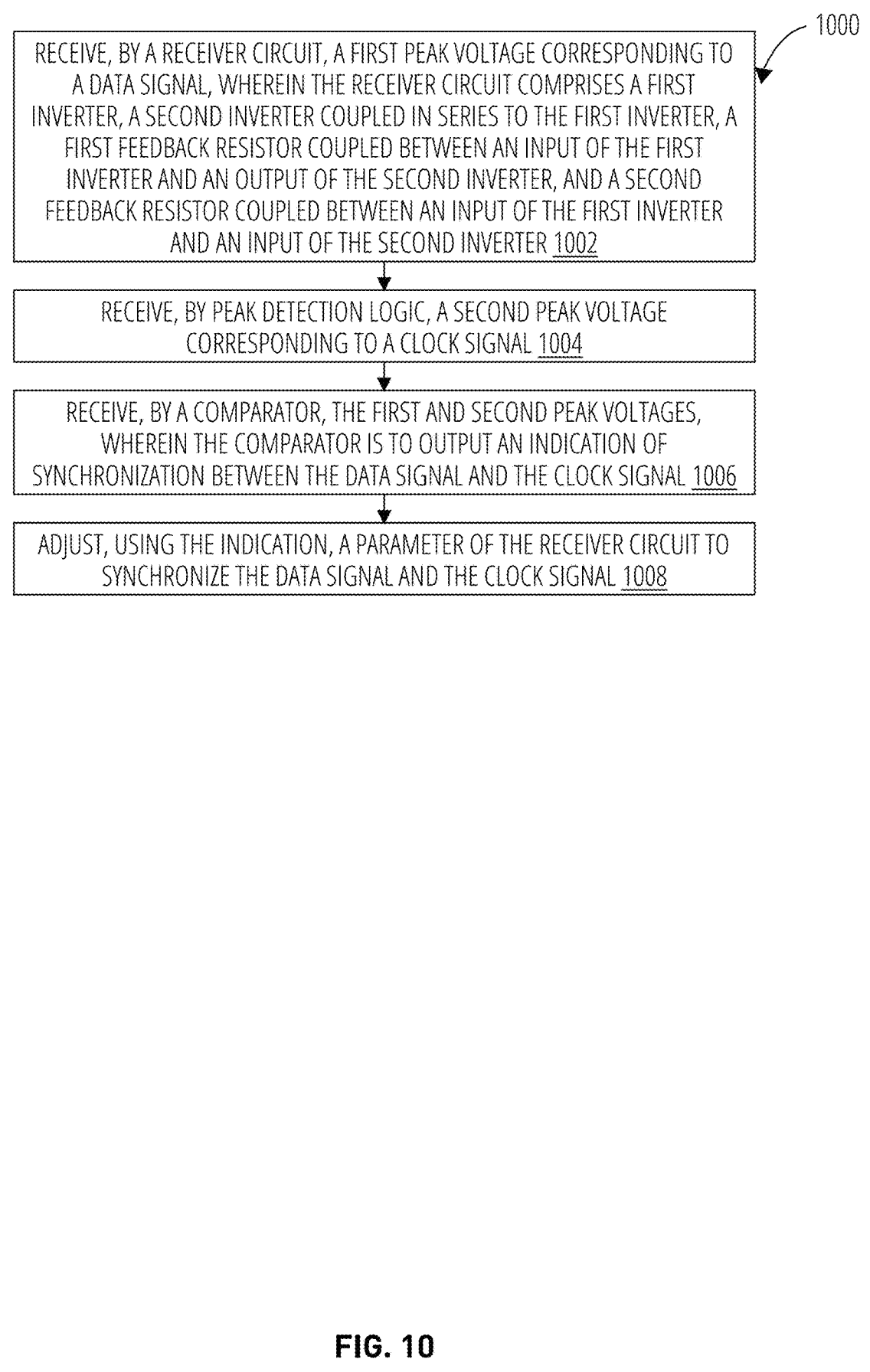

1000

RECEIVE, BY A RECEIVER CIRCUIT, A FIRST PEAK VOLTAGE CORRESPONDING TO A DATA SIGNAL, WHEREIN THE RECEIVER CIRCUIT COMPRISES A FIRST INVERTER, A SECOND INVERTER COUPLED IN SERIES TO THE FIRST INVERTER, A FIRST FEEDBACK RESISTOR COUPLED BETWEEN AN INPUT OF THE FIRST INVERTER AND AN OUTPUT OF THE SECOND INVERTER, AND A SECOND FEEDBACK RESISTOR COUPLED BETWEEN AN INPUT OF THE FIRST INVERTER AND AN INPUT OF THE SECOND INVERTER 1002

RECEIVE, BY PEAK DETECTION LOGIC, A SECOND PEAK VOLTAGE CORRESPONDING TO A CLOCK SIGNAL 1004

RECEIVE, BY A COMPARATOR, THE FIRST AND SECOND PEAK VOLTAGES, WHEREIN THE COMPARATOR IS TO OUTPUT AN INDICATION OF SYNCHRONIZATION BETWEEN THE DATA SIGNAL AND THE CLOCK SIGNAL 1006

ADJUST, USING THE INDICATION, A PARAMETER OF THE RECEIVER CIRCUIT TO SYNCHRONIZE THE DATA SIGNAL AND THE CLOCK SIGNAL 1008

FIG. 10

CLOCK-TO-DATA SYNCHRONIZATION

BACKGROUND

The ever-increasing demand for high-performance computing (HPC) requires high-density, low-power interconnects to move large amounts of data between co-packaged dies. There are some architectures design to meet those criteria, such as simultaneous bi-directional (SBD) communication systems or other communication systems having bi-directional links. But bi-directional links have DC current overhead associated with terminating both ends, resulting in poor power efficiency in low activity scenarios. In scenarios where power should scale with activity rate, unidirectional complementary metal-oxide-semiconductor (CMOS) links with unterminated lines are popular. However, such CMOS links have large switching noise at the transmitter.

Inverter Short-Reach AC-Coupled Uni-Directional Link (ISR-ACUD) is based on transmitting only the bits transitions, which removes the DC current overhead. ISR-ACUD utilizes a small signal amplitude to reduce dynamic power consumption and switching noise.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 10 illustrates a method of synchronizing a data signal and a clock signal, according to one embodiment.

DETAILED DESCRIPTION

Figure 1:
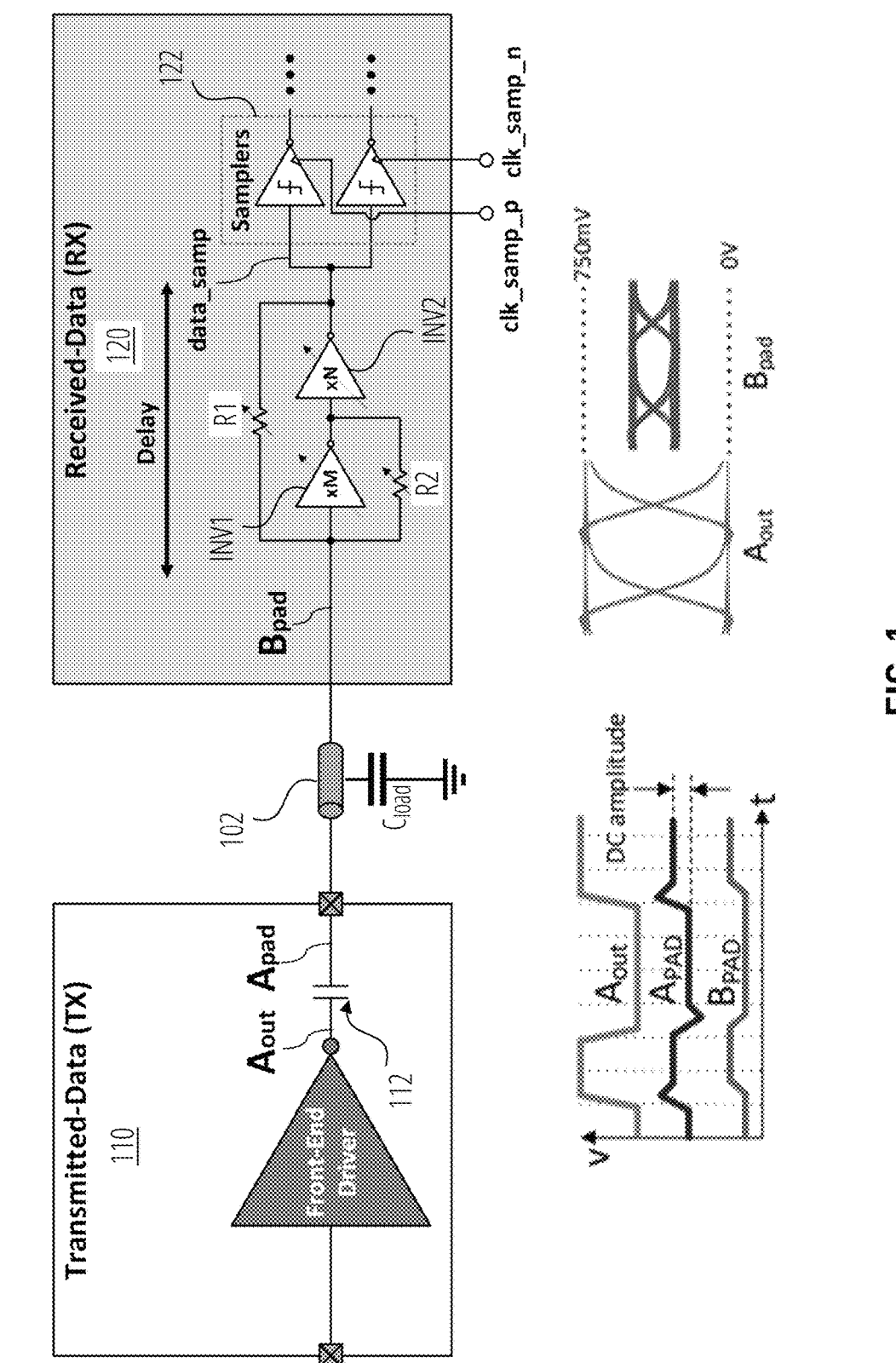
FIG. 1 depicts a receiver device with adjustable components coupled to a data line, according to one embodiment.

Technology related to calibrating synchronization of a data signal to a forwarded clock signal is described. In short-reach die-to-die communication, such as that over channels (e.g., silicon interposers or similar high-density interconnects), clock(s) are forwarded from one side to the other and used to sample transmitted data in the receiver (RX) on the other side. Thus, after forwarding (e.g., transmitting), the clock signal(s) and the data signal should be synchronized to facilitate correct sampling. However, in many cases, the clock and data signals are skewed (e.g., unsynchronized) after forwarding due to differing attributes of the channels. For example, a typically chip-to-chip communication system may have many different transceiver pairs that are each connected by channels. These channels between transmit (TX) and receive (RX) portions of the transceiver pairs will likely have varying characteristics, such as different lengths, different curves, or different capacitances (e.g., Cload). These varying characteristics, in addition to random mismatching of components of the transceiver, the clock and data signals may be skewed after passing through their respective channels. Even in the case that channels or other transceiver components are designed to be identical, there can be a difference between the actual characteristic of each one of those component in different transceiver pairs due to manufacturing limitations. Additionally, because the clock signal generally has more transitions than the data signal, the data signal may experience a larger voltage swing than the data signal, which may also contribute to the skew. This skew should be compensated for.

One solution for compensating for this skew is adding a configurable delay line on a clock path (e.g., a path by which the clock is forwarded from one side to the other) or a data path (e.g., a path by which the data is forwarded from one side to the other), or both. These configurable delay line(s) may then be modified to synchronize the data and clock on the RX side. However, the usage of delay lines adds additional power-consumption waste both in the clock-path and data-path, adds more jitter in both data and clock paths, and may be susceptible to supply-voltage and temperatures variations.

Aspects and embodiments of the present disclosure described herein address the problems and deficiencies described above and others by providing a calibration system that matches a peak-to-peak (p2p) amplitude of the forwarded data signal to a p2p amplitude of the forwarded clock signal. Matching the p2p amplitudes of the forwarded data and clock signals significantly reduces or eliminates the skew described above. In some embodiments, to match these p2p amplitudes, the calibration system may compare a peak (maximum or minimum) of the data signal to a peak (maximum or minimum) of the clock signal. The calibration system may adjust one or more components of a receiver circuit until these peaks are approximately the same. These adjustable components of the receiver circuit may be a resistor or inverter.

Aspects and embodiments of the present disclosure provide a calibration system that includes one or more configurable components, such as a configurable resistor or configurable inverter. The calibration system may include a receiver circuit that receives a data signal. The receiver circuit may be coupled to a data line that carries the data signal. The receiver circuit may include a first inverter, a second inverter, a first feedback resistor, and a second feedback resistor. A clock-to-data synchronization circuit may receive the data signal and a clock signal and determine an indication of synchronization between the data signal and the clock signal. Based on this indication, a parameter of the receiver circuit may be adjusted to synchronize the data signal and the clock signal.

Aspects and embodiments of the present disclosure provide a communication device including a receiver, memory, and a controller operatively coupled to the memory. The receiver may include at least an inverter having an input to receive a data signal, a resistor coupled in parallel to the first inverter, peak detection logic to receive a clock signal, a comparator having a first input coupled to the input of the first inverter and a second input coupled to the peak detection logic. The controller may execute instructions stored within the memory. These instructions may instruct the controller to receive an indication from the comparator. This indication may be based on a comparison of voltage levels at the two inputs of the comparator. Then, based on this indication, the instructions may instruct the controller to cause a resistance of the resistor or an on-resistance of the inverter to be adjusted.

Figure 3:
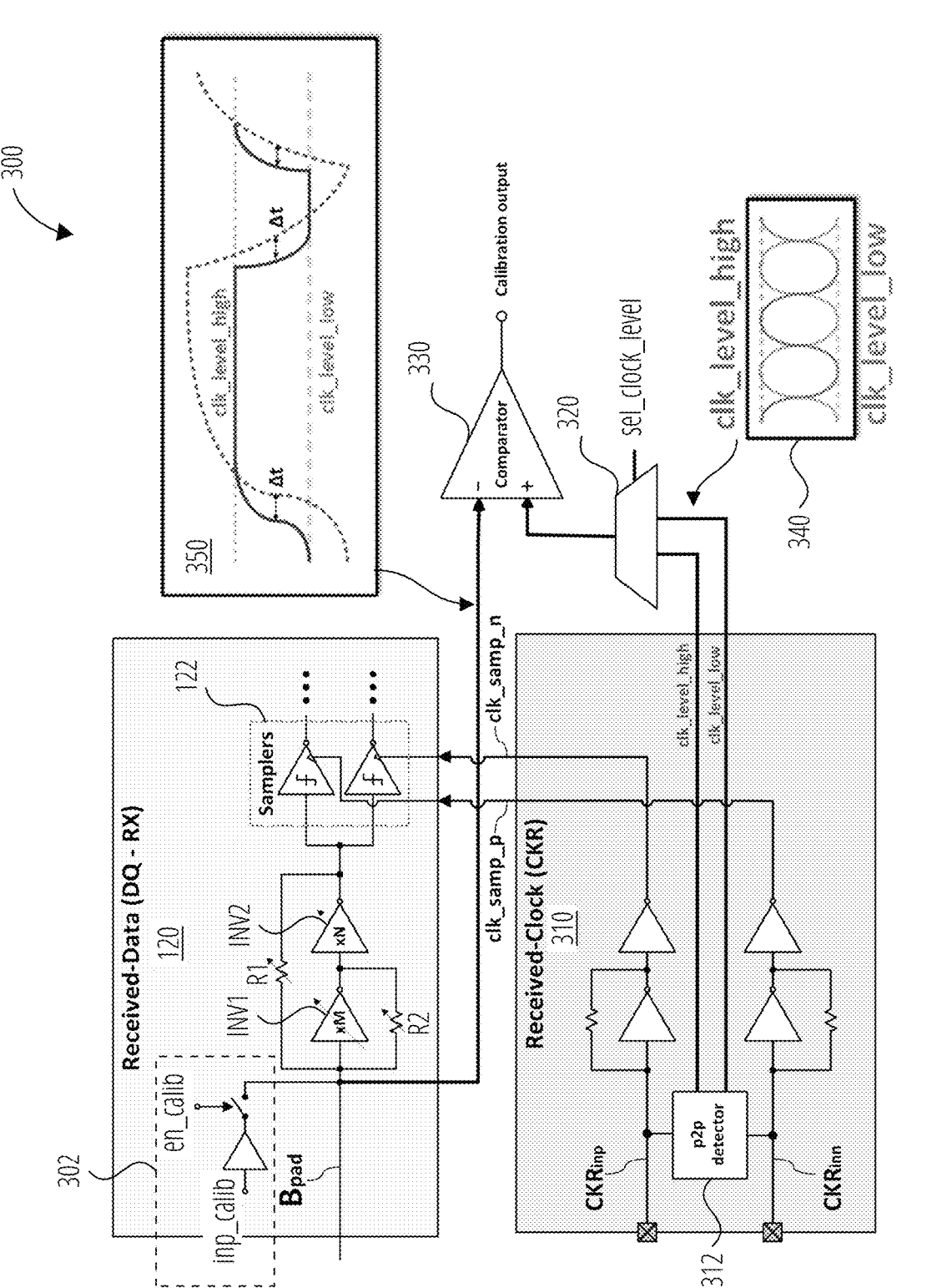
FIG. 3 depicts a calibration system to calibrate a receiver device (RX) coupled to a data line of a communication system to a received clock (CKR) receiving a differential clock pair, according to one embodiment.
Figure 4:
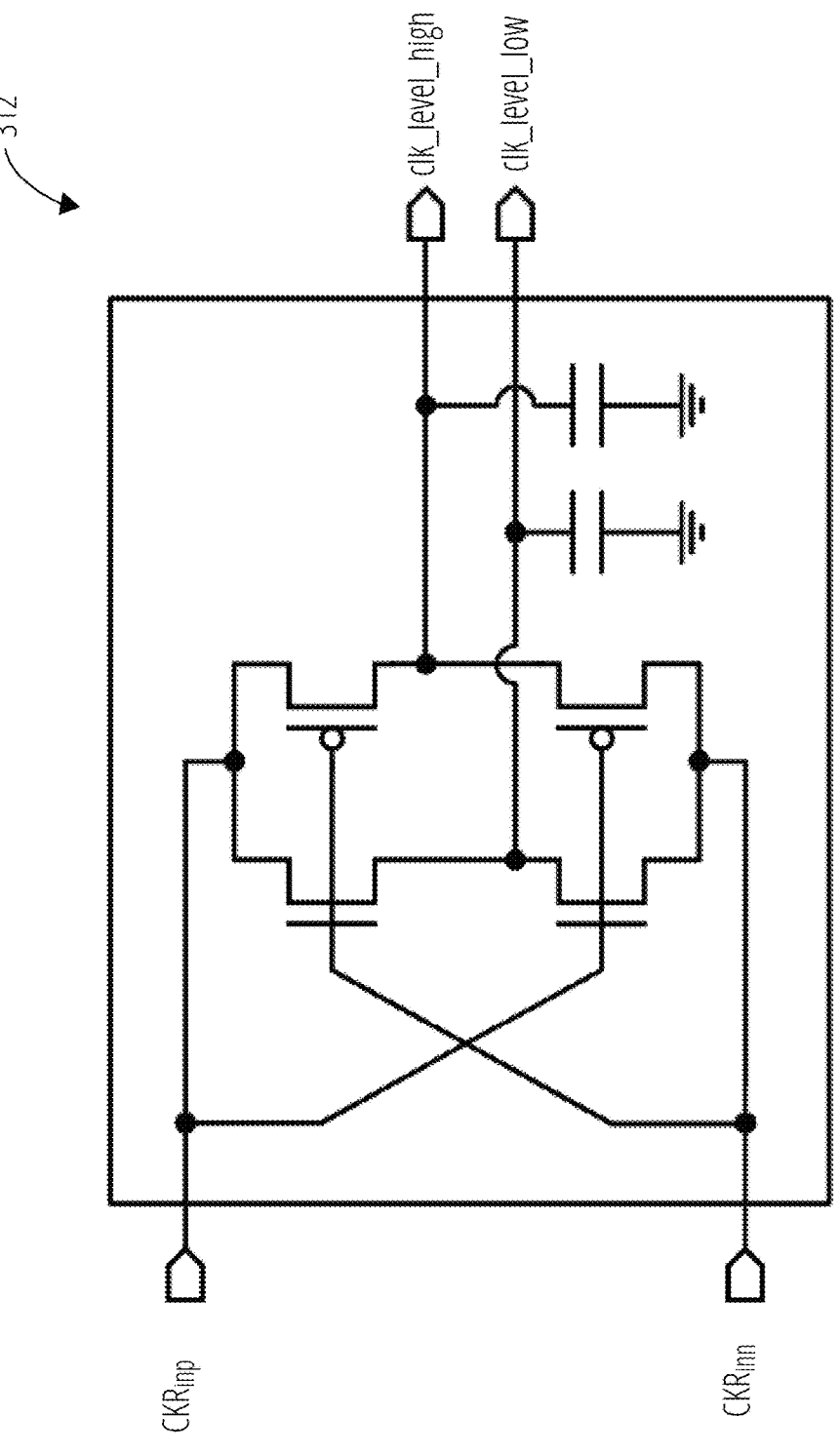
FIG. 4 depicts peak-to-peak (p2p) detector logic, according to one embodiment.

As used herein, unless otherwise stated, "trough" refers to a minimum peak voltage level while "peak" refers to a maximum peak voltage level of the data or clock signal. In at least some cases, both trough voltage levels and peak voltage levels may be referred to as peak voltage levels, as a trough voltage level is a minimum peak voltage level. The minimum voltage level of the clock signal may also be referenced as clk_level_low, as illustrated in FIGS. 3-4. The maximum voltage level of the clock signal may also be referenced as clk_level_high, as illustrated in FIGS. 3-4.

FIG. 1 depicts a communication system 100 with adjustable components, according to one embodiment. The communication system 100 may include a transmitter device (TX) 110 and a receiver device (RX) 120 that communicate over a data line. The TX 110 and the RX 120 coupled by the data line is sometimes referred to as a DQ line. The data line may include a channel 102. In one embodiment, the channel 102 may be a silicon interposer or a different interconnect that enables die-to-die communication. In this embodiment, the TX 110 may be on a different die than the RX 120. In another embodiment, the channel 102 may enable same-die communication such as any system on chip (SoC) interconnect.

The TX 110 may include a front-end driver coupled to a small capacitor 112. The capacitor 112 may be coupled to the channel 102, which may have a capacitance $C_{load}$. The RX 120 may include a first inverter INV1, a second inverter INV2, a first feedback resistor R1, a second feedback resistor R2, and samplers 122. In at least one embodiment, the samplers 122 are half-rate samplers that each sample a different differential clock signal each operating at half of the desired clock rate. While each of these inverters and feedback resistors are illustrated as being adjustable, only one of these components must be configurable for the calibration system taught herein to be enabled. In other words, in at least one embodiment, to synchronize a forwarded data signal received by the RX 120 to forwarded clock signal(s), only one of the INV1, INV2, R1, or R2 may be adjustable.

For one of the inverters INV1, INV2 to be adjustable, an on-resistance parameter of either INV1 or INV2 may be adjustable. In at least one embodiment, the on-resistance of the inverter (INV1 or INV2 or both) may be adjusted by enabling or disabling transistors within the inverter. An on-resistance ratio may be representative of a relationship between INV1 and INV2. The on-resistance ratio may be calculated by determining a number of enabled transistors M of INV1 and a number of enabled transistors N of INV2 and finding the ratio between M and N (e.g., M/N, or N/M). This on-resistance ratio may also be determined by directly comparing the on-resistance of INV1 and the on-resistance of INV2. This on-resistance ratio may impact peak and trough voltage levels of a data signal (e.g., $B_{PAD}$) over the input pad (i.e., node of RX 120 connected to the input of INV1) and also the delay of the data signal from the input pad to the samplers 122. Thus, changing this on-resistance ratio by adjusting the on-resistance of one or more of INV1 and INV2 may impact peak and trough voltage levels of a signal over the input pad and the delay of the data signal from the input pad to the samplers 122. Similarly, in at least one embodiment, adjusting this on-resistance ratio modifies the peak-to-peak amplitude of the data signal.

For one of the resistors R1, R2 to be adjustable, a resistance parameter should be adjustable. In at least one embodiment, one or more of R1 and R2 may be a type of potentiometer, such as a digital potentiometer, a trimming potentiometer, a voltage-controlled resistor, or other suitable type of adjustable resistor. A resistance ratio may be calculated by comparing the resistance of R1 and the resistance of R2 (e.g., R1/R2, or R2/R1). This resistance ratio may impact peak and trough voltage levels of a data signal over the input pad and also the delay of the data signal from the input pad to the samplers 122. Thus, changing this resistance ratio by adjusting the resistance of one or more of R1 and R2 may impact peak and trough voltage levels of the data signal over the input pad and the delay of the data signal from the input pad to the samplers 122. Similarly, in at least one embodiment, adjusting this resistance ratio modifies the peak-to-peak amplitude of the data signal.

Each of the samplers 122 may receive a clock signal. In one embodiment, each sampler 122 may receive one of a differential clock pair. In this embodiment, each sampler 122 may sample the data signal on a same type of edge (e.g., rising edge or falling edge). As illustrated, a first sampler 122 receives a first clock signal of a differential clock pair (clk_samp_p) and samples on rising edges of the first clock signal, while a second sampler 122 receives a second clock signal of the differential clock pair (clk_samp_n) and samples on rising edges of the second clock signal. In another embodiment, the samplers 122 may each receive the same clock signal and sample on alternating edges (e.g., first sampler 122 samples on rising edges, second sampler 122 samples on falling edges). Sampling on a same edge of half-rate differential clock pairs, or sampling on alternating edges of a single half-rate clock signal may be referred to as half-rate sampling. In another embodiment, one sampler 122 may receive a full-rate clock signal and sample the data signal on either the rising or falling edge of the full-rate clock signal.

As illustrated, the front-end driver of the TX 110 outputs a signal $A_{out}$. This signal $A_{out}$ may have a peak-to-peak (p2p) amplitude of 750 mV (as illustrated), with the peak voltage level being 750 mV and the trough voltage level being 0 V. The capacitor 112 receives $A_{out}$ and transmits a signal $A_{PAD}$ that indicates transitions of $A_{out}$ between its peak voltage level and trough voltage level. However, the peak and trough voltage levels of $A_{PAD}$ may be significantly smaller than the peak and trough voltage levels of $A_{out}$, which means that the p2p amplitude of $A_{PAD}$ is also significantly smaller than the p2p amplitude of $A_{out}$. $A_{PAD}$ may be forwarded through the channel 102 to the RX 120, which receives $B_{PAD}$ at the input pad. $B_{PAD}$ may also have peak and trough voltage levels significantly smaller than the peak and trough voltage levels of $A_{out}$, which also means that the p2p amplitude of $B_{PAD}$ is significantly smaller than the p2p amplitude of $A_{out}$.

In some embodiments, adjusting INV1, INV2, R1, or R2 as described above affects the peak and trough voltage levels (and, similarly, the p2p amplitude) of data signal at the input pad, which is $B_{PAD}$. Thus, the peak and trough voltage levels of $B_{PAD}$ may be modifiable by adjusting at least one of INV1, INV2, R1, or R2.

Figure 2:
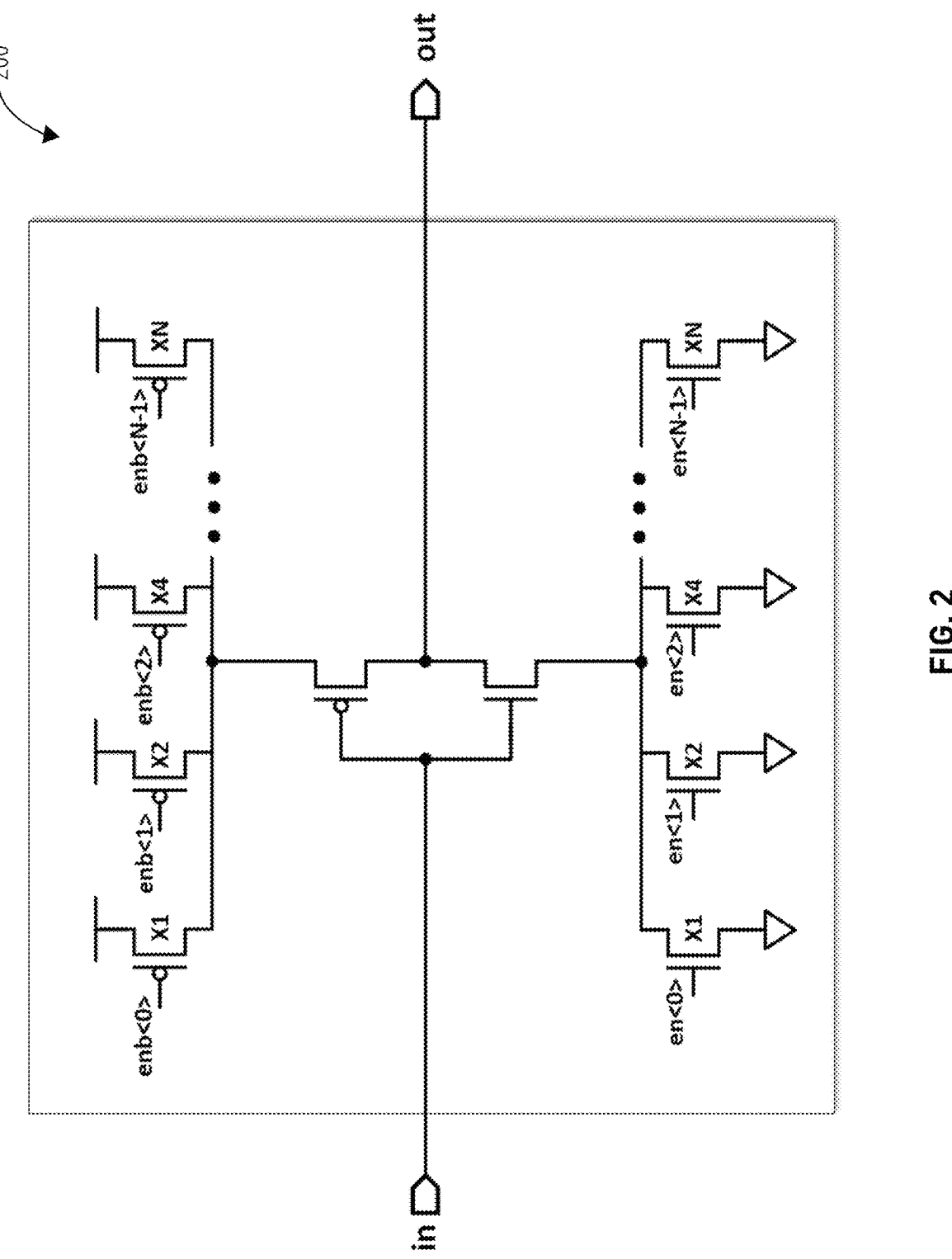
FIG. 2 depicts an inverter with transistor bank(s), according to one embodiment.

FIG. 2 depicts an inverter 200 with transistor bank(s), according to one embodiment. In at least one embodiment, the inverter 200 is representative of INV1 or INV2 of FIG. 1. The inverter 200 may include a transistor bank having a first portion (e.g., header) and a second portion (e.g., tail). N pairs of enablable (or un-enablable) transistors (e.g., X1, X2, etc.) with a first transistor being part of the header and a second transistor being part of the footer. Each pair of transistors may include an N-type metal-oxide-semiconductor (NMOS) transistor and a P-type metal-oxide-semiconductor (PMOS) transistor. By enabling (or disabling) a portion of these transistors, an on-resistance of the inverter 200 may be adjusted. This is because the on-resistance of the inverter 200 is directly correlated to the number of enabled NMOS/PMOS transistors. Gates of these pairs of enablable transistors may each receive a signal (e.g., en<0>, enb<0>, en<1>, enb<1>, etc.) that enables or disables each transistor.

FIG. 3 depicts a calibration system to calibrate a receiver device (RX) (e.g., a receiver circuit) coupled to a data line of a communication system to a received clock (CKR) receiving a differential clock pair, according to one embodiment. In at least one embodiment, the RX may be the RX 120 as described above in FIG. 1. The RX 120 may further include a calibration enabling circuit 302. In another embodiment, the calibration enabling circuit 302 may be outside of the RX 120 (e.g., on a different part of a same die, or on a different die). The calibration enabling circuit 302 may include a switch coupled to the input pad of the RX 120. The calibration enabling circuit 302 may provide a direct current (DC) voltage to the input pad. The DC voltage may be generated various ways, including by using a buffer. The buffer may hold one of a first set of data (e.g., a set of zeroes), a second set of data (e.g., a set of ones), or both. In some embodiments, a variable (e.g., inp_calib) may indicate which set of data is to be loaded into the buffer. When the calibration enabling circuit 302 is enabled (e.g., based on a signal en_calib), the calibration enabling circuit 302 may cause $B_{PAD}$ to equal a peak or trough voltage level of $B_{PAD}$. For example, if inp_calib indicates that the trough voltage level of $B_{PAD}$ is to be calibrated (synchronized, or compared) to the trough of a differential clock pair, the buffer may load low values (e.g., zeroes) into the data stream, which may cause $B_{PAD}$ to equal to its trough (i.e., minimum) voltage level. The input pad of RX 120, which carries $B_{PAD}$, may be coupled to a first input of a comparator 330. A more detailed explanation of the operations of the calibration enabling circuit is provided below with respect to FIG. 1.

The CKR 310 may include peak detection logic 312 that receives a differential clock pair. The peak detection logic 312 may output peak and trough voltage levels in direct current (DC) form of the differential clock pair. These peak and trough voltage levels of the differential clock pair may then be provided to a multiplexer (MUX) 320 that selects either the peak or trough voltage level to be sent to a second input of the comparator 330 (e.g., based on a signal sel_clock_level). Thus, the comparator 330 may compare one of the peak or trough voltage level of $B_{PAD}$ to the corresponding peak or trough voltage level of the differential clock pair. The peak detection logic 312 is described in more detail below in FIG. 4.

In some embodiments, the comparator 330 and the peak detection logic 312 may be considered part of a clock-to-data synchronization circuit. In one embodiment, the comparator 330 and surrounding circuitry (e.g., calibration enabling circuit 302 or MUX 320) without the peak detection logic 312 may be considered a clock-to-data synchronization circuit. The comparator 330 may generate an output after comparing the peak or trough of $B_{PAD}$ to the corresponding peak or trough of the differential clock pair. This calibration output may be an indication of whether the respective peaks or troughs are approximately equal to each other. If the calibration output indicates that the respective peaks or troughs are not approximately equal, this may also mean that a p2p amplitude of $B_{PAD}$ and the differential clock pair are also not approximately equal. In this scenario, one of the INV1, INV2, R1, or R2 may be adjusted such that the compared peak or trough of $B_{PAD}$ converges (or approaches) the respective peak or trough of the differential clock pair. The INV1, INV2, R1, or R2 may be iteratively adjusted until the calibration output indicates that the respective peaks or troughs of $B_{PAD}$ and the differential clock pair are approximately equal.

In at least one embodiment, a controller may control the various inputs (e.g., inp_calib, en_calib, sel_clock_level) of the calibration system 300. The controller may also receive the calibration output from the comparator 330 and cause a resistance of R1 or R2 or an on-resistance of INV1 or INV2 to be adjusted, as described above with respect to FIGS. 1-2. The controller may adjust the resistance or on-resistance of R1, R2, INV1, or INV2 until the peaks or troughs of the data signal and the differential clock pair are approximately equal, or until the p2p amplitude of the data signal is approximately equal to the p2p amplitude of the differential clock pair (which may be the same thing).

Graph 340 shows the peak and trough voltage levels of the differential clock pair. Because differential clock pairs are typically designed to be 180 degrees out of phase with each other, the differential clock pair will concurrently reach peak and trough voltage levels, respectively. In graph 340, the lower dotted line represents the trough voltage level, while the upper dotted line represents the peak voltage level.

Graph 350 shows a data signal out-of-synchronization (e.g., out-of-calibration) with a clock signal of the differential clock pair. An unsynchronized data signal is represented by the dotted line, while a synchronized data signal is represented by the solid line. The lower horizontal dotted line represents the trough voltage level of the synchronized data signal, and the upper horizontal dotted line represents the peak voltage level of the synchronized data signal. In graph 350, the unsynchronized and synchronized data signals are aligned so that they each experience a peak-to-peak (e.g., peak to trough, or trough to peak) transition at approximately the same time. As can be seen, because the unsynchronized data signal has a greater p2p amplitude than the synchronized data signal (i.e., by having lower trough and higher peak voltage levels than the synchronized data signal), an undesired delay $\Delta t$ occurs. This delay $\Delta t$ may similarly be seen if the unsynchronized data signal had a smaller p2p amplitude than the synchronized data signal (i.e., by having higher trough and lower peak voltage levels than the synchronized data signal). When this delay $\Delta t$ exists, there is a possibility for the samplers 122 to incorrectly sample the unsynchronized data signal. However, this possibility is greatly reduced or eliminated for the synchronized data signal. Thus, by reducing or eliminating the delay $\Delta t$ by using the processes and methods described herein, a confidence in accurately sampling the data signal with the samplers 122 significantly increases.

FIG. 4 depicts peak detection logic 312, according to one embodiment. The peak detection logic 312 may include one or more interconnected N-type metal-oxide-semiconductor (NMOS) and P-type metal-oxide-semiconductor (PMOS) transistors and capacitors. The peak detection logic 312 may have 2 differential clock inputs ($CKR_{inp}$ & $CKR_{inn}$) and two outputs signals (clk_level_high & clk_level_low). The two output signals have DC voltages which are proportional to the peak (highest) and trough (lowest) voltage levels of the transient signals over the differential inputs correspondingly.

Because the inputs are differential clock signals, when one of them is at its maximum value, the other is at its minimum value (e.g., because the differential clock signals are 180 degrees out of phase with each other). At these moments, one of the NMOS and one of the PMOS switches will be conducting, and the outputs will be charged to the respective peak (clk_level_high) or trough (clk_level_low) DC levels.

Figure 5:
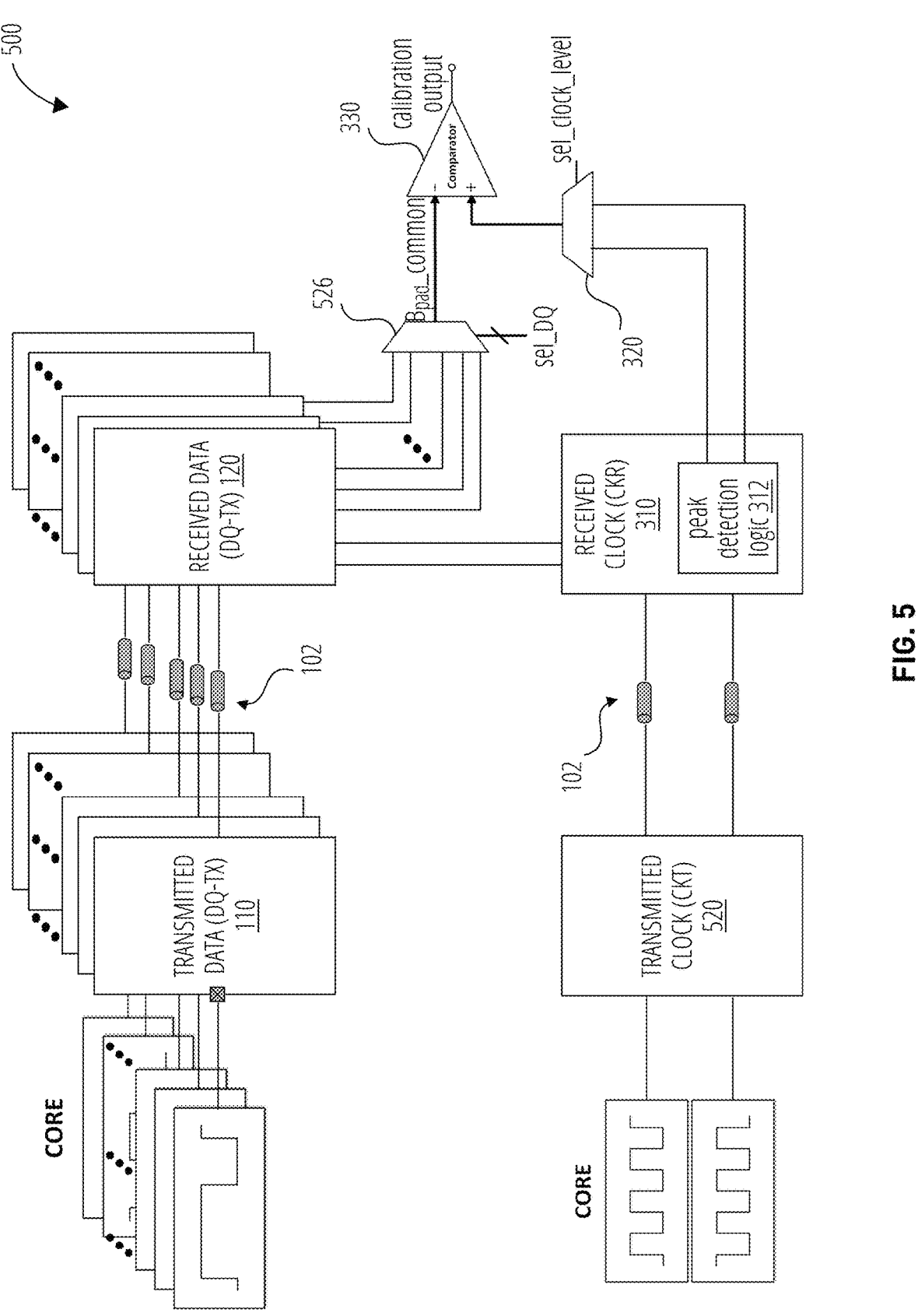
FIG. 5 depicts a calibration system to calibrate multiple receiver devices (RXs) each coupled to a data line of a communication system with differential clock pair forwarding, according to one embodiment.

FIG. 5 depicts a calibration system to calibrate multiple receiver devices (RXs) 120 each coupled to a data line of a communication system with differential clock pair forwarding, according to one embodiment. Having multiple RXs in the communication system may improve data transfer rates and overall performance of the communication system. Each of the RXs may be coupled to a TX 110 by respective data lines each having a channel 102. Each RX 120 may have an input pad (e.g., node coupled to the input of INV1) that carried a signal $B_{PAD}$, as described above with respect to FIG. 1 and FIG. 3. Each of these input pads may be coupled to a MUX 526 that receives a signal (e.g., sel_DQ) that determines which RX 120 calibrated to the forwarded differential clock pair. The $B_{PAD}$ signal of the selected RX 120 is then sent to the comparator 330, as described in FIG. 3.

Properties of each of the channels 102 may vary, which may cause a signal $B_{PAD}$ of each RX 120 to also vary. For example, the channels 102 may have different physical layouts or wirelengths, which can cause differing amounts of attenuation across each channel. The channels 102 may also experience different amounts of cross-talk that occurs when an electromagnetic field from one signal line affects another nearby signal line. Cross-talk can cause signal integrity issues, including variations in peak-to-peak amplitude, as the coupling strength can vary depending on the physical proximity and layout of the signal lines (including the channels 102). The 102 may also experience differing levels of dielectric loss if dielectrics are used in the substrate or around the channels 102. These dielectric losses can vary across the die due to material inhomogeneities or differences in the local environment of the TXs 10 and RXs 120. The channels 102 can also have different load impedances, which can cause the channels 102 to reflect varying strengths of the data signal back towards the source, causing variations in the peak-to-peak amplitude at the RX 120. The channels 102 can also affect the peak-to-peak amplitude at the RX 120 in diverse ways, such as power supply noise, temperature gradients, manufacturing variabilities, and the skin effect.

In some embodiments, the differential clock pair is sent to the CKR 310 by transmitted clock (CKT) logic 520. The CKT 520 may be coupled to the CKR 310 via one or more data lines each having channels 102. In at least one embodiment, the CKT 520 may send the differential clock pair via two different data lines to the CKR 310. Once the CKR 310 receives the differential clock pair, the peak detection logic 312 may output two DC voltages proportional to the peak (highest) and trough (lowest) voltage levels of the differential clock pair. These outputs may be provided to the MUX 320 that selects either the peak or trough voltage level based on a signal (e.g., sel_clock_level). The selected peak or trough voltage level is then sent to the comparator 330, as described in FIG. 3.

The comparator 330 may generate an output after comparing the peak or trough of the $B_{PAD}$ of the selected RX 120 to the corresponding peak or trough voltage level of the differential clock pair. This calibration output may be an indication of whether the respective peaks or troughs are approximately equal to each other. If the calibration output indicates that the respective peaks or troughs are not approximately equal, this may also mean that a p2p amplitude of $B_{PAD}$ and the differential clock pair are also not approximately equal. In this scenario, one of the INV1, INV2, R1, or R2 may be adjusted such that the compared peak or trough of $B_{PAD}$ converges (or approaches) the respective peak or trough of the differential clock pair. The INV1, INV2, R1, or R2 may be iteratively adjusted until the calibration output indicates that the respective peaks or troughs of $B_{PAD}$ and the differential clock pair are approximately equal.

Once the respective peaks or troughs of $B_{PAD}$ and the differential clock pair are approximately equal, the calibration system 500 may cause the MUX 526 to select a different RX 120 (e.g., via sel_DQ) to be calibrated to the differential clock pair. This process may repeat until each of the RXs 120 are calibrated to the differential clock pair.

Figure 6:
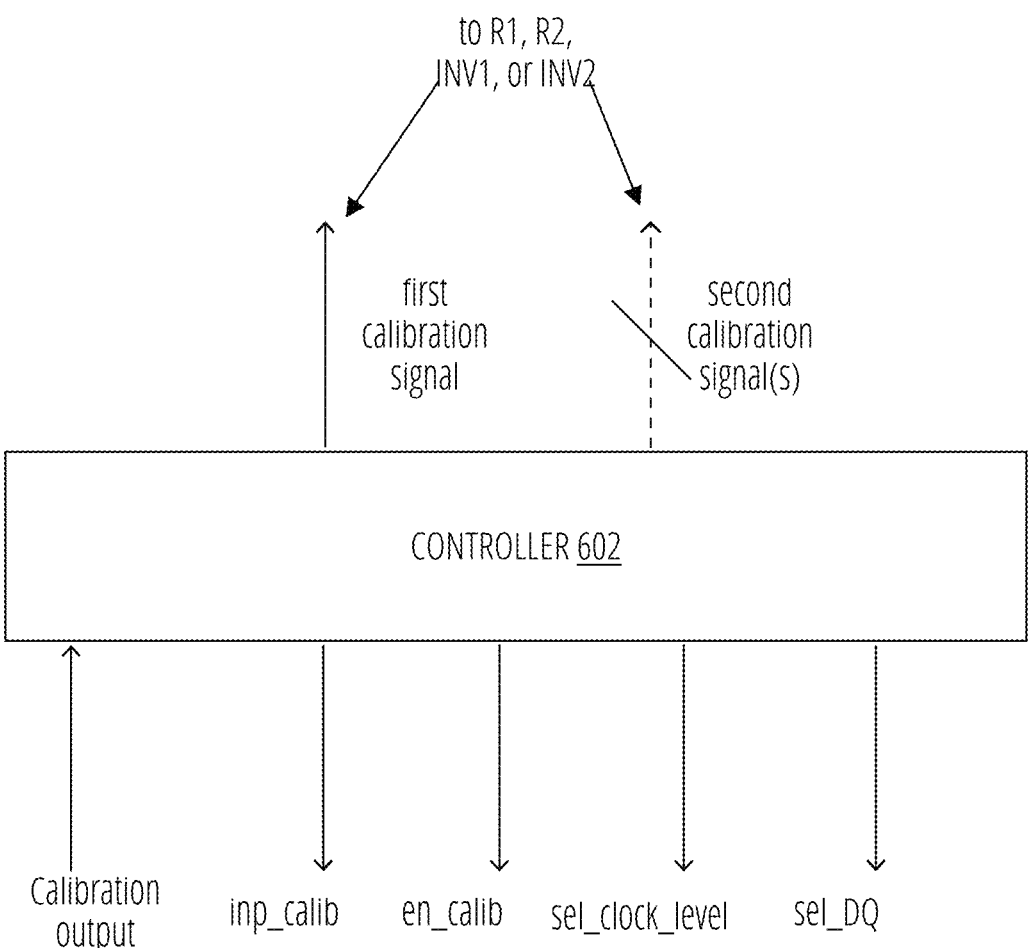
FIG. 6 depicts a controller sending signals to a calibration system, according to one embodiment.

FIG. 6 depicts a controller 602 sending signals to a calibration system as illustrated in FIG. 5 and FIG. 3, according to one embodiment. The controller 602 may include processing logic including software, hardware, firmware, or a combination thereof. The processing logic may be operatively coupled to memory (e.g., one or more memory storage devices or components) storing instructions that, when performed by the processing logic, cause at least one receiver device to be calibrated (e.g., synchronized) to a clock differential pair. In at least one embodiment, the processing logic may include one or more digital signal processing (DSP) blocks. In some embodiments, the controller 602 may perform the operations of the method 900 as described in FIG. 9.

As illustrated, the controller 602 may send various signals to the calibration system 500 and receive at least one signal from the calibration system 500. In some embodiments, the controller 602 may send signals inp_calib and en_calib to the calibration enabling circuit 302 (as illustrated in FIG. 3). The controller 602 may also send signal sel_clock_level to the MUX 320 (as illustrated in FIG. 3 and FIG. 5). The controller 602 may also send signal sel_DQ to the MUX 526 (as illustrated in FIG. 5). In one embodiment, each of these signals may be sent to the calibration system according to the method 900 described in FIG. 9. In another embodiment, each of these signals may be sent to the calibration system according to a different method or process of calibrating a receiver device to a differential clock pair.

The calibration output from the comparator 330 may be received by the controller 602. Based on the calibration output, the controller 602 may send or modify a first calibration signal to one of R1, R2, INV1, or INV2. The first calibration signal may cause the resistance of one of R1 or R2 to adjusted, or the on-resistance of one of INV1 or INV2 to be adjusted. By sending or modifying the first calibration signal, the controller 602 may cause a first ratio between resistances of R1 and R2 to change or a second ratio between on-resistances of INV1 and INV2 to change. In at least one embodiment, second calibration signal(s) may also be sent to the remaining of R1, R2, INV1, or INV2 that operate similarly to the first calibration signal. Sending or modifying these calibration signal(s) may cause the peak-to-peak amplitude of the selected $B_{PAD}$ to converge to the peak-to-peak amplitude of the differential clock pair. These calibration signal(s) may be iteratively sent or modified until the peak-to-peak amplitude of the selected $B_{PAD}$ is approximately equal to the peak-to-peak amplitude of differential clock pair, or the respective peaks and troughs of the selected $B_{PAD}$ and differential clock pair are approximately equal.

Figure 7:
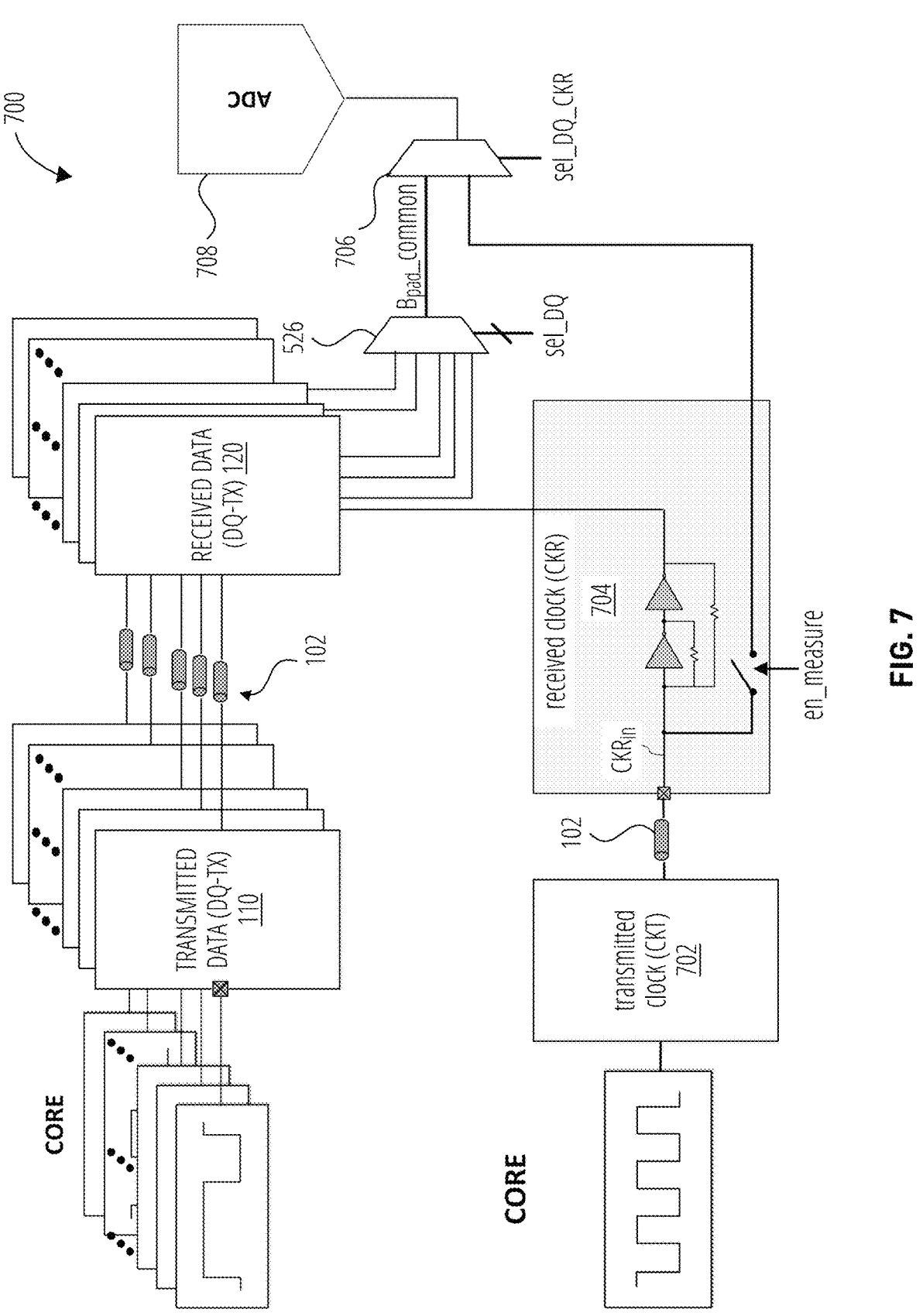
FIG. 7 depicts a calibration system to calibrate multiple RXs to a communication system with single-ended clock forwarding, according to one embodiment.

FIG. 7 depicts a calibration system 700 to calibrate multiple receiver devices (RXs) 120 of a communication system with single-ended clock-forwarding, according to one embodiment. The calibration system 700 may include at least some of the same features or operations of the calibration system 500 that are compatible with calibrating multiple RXs 120 to a single clock signal (e.g., not a differential clock pair). The calibration system 700 may include a received clock (CKR) 704 that receives a clock signal $CKR_{in}$ from transmitted clock (CKT) logic CKT 702 across a channel 102. This clock signal $CKR_{in}$ is sent, over a switch (enabled by a signal en_measure), to a MUX 706 that alternates between sending a $B_{PAD}$ signal of an input pad of a RX 120 and $CKR_{in}$ to an analog-to-digital converter (ADC) 708.

In at least one embodiment, the ADC 708 may only be active during calibration of the communication system. During calibration, the ADC 708 samples $CKR_{in}$. Respective minimal (trough) and maximal (peak) voltage levels of $CKR_{in}$ are then determined and stored to reference against the respective $B_{PAD}$ signals of the RXs 120. Thus, the ADC 708 has a sample frequency higher than the frequency of $CKR_{in}$. In at least one embodiment, to facilitate reasonable synchronization accuracy, the sample frequency may be at least ten times (10x) larger than the frequency of $CKR_{in}$. The accuracy of synchronization between the data and clock signal may be improved by increasing the sample frequency of the ADC. Once the trough and peak values of $CKR_{in}$ are known, the MUX 706 may then cause the selected $B_{PAD}$ signal (e.g., selected by the MUX 526) to be sent to the ADC 708. Respective trough and peak voltage levels of the selected $B_{PAD}$ are determined and compared to the trough and peak voltage levels of $CKR_{in}$. Based on this comparison, the resistance of R1 or R2, or on-resistance of INV1 or INV2 may be adjusted to cause the peak-to-peak amplitude of the selected $B_{PAD}$ to converge to the peak-to-peak amplitude of $CKR_{in}$. This adjustment may be the same or similar to what is described above with respect to FIGS. 1-6.

Notwithstanding the above description, in at least one embodiment, only the trough or the peak of the selected $B_{PAD}$ may be compared to $CKR_{in}$. In this embodiment, peak-to-peak amplitude of the selected $B_{PAD}$ may sufficiently converge to the peak-to-peak amplitude of $CKR_{in}$ once either the peak or trough voltage level of the selected $B_{PAD}$ is approximately equal to the respective peak or trough voltage level of $CKR_{in}$.

Once the respective peaks or troughs of the selected $B_{PAD}$ and the differential clock pair are approximately equal, the calibration system 700 may cause the MUX 526 to select a different RX 120 (e.g., via sel_DQ) to be calibrated to $CKR_{in}$. This process may repeat until each of the RXs 120 are calibrated to $CKR_{in}$.

Figure 8:
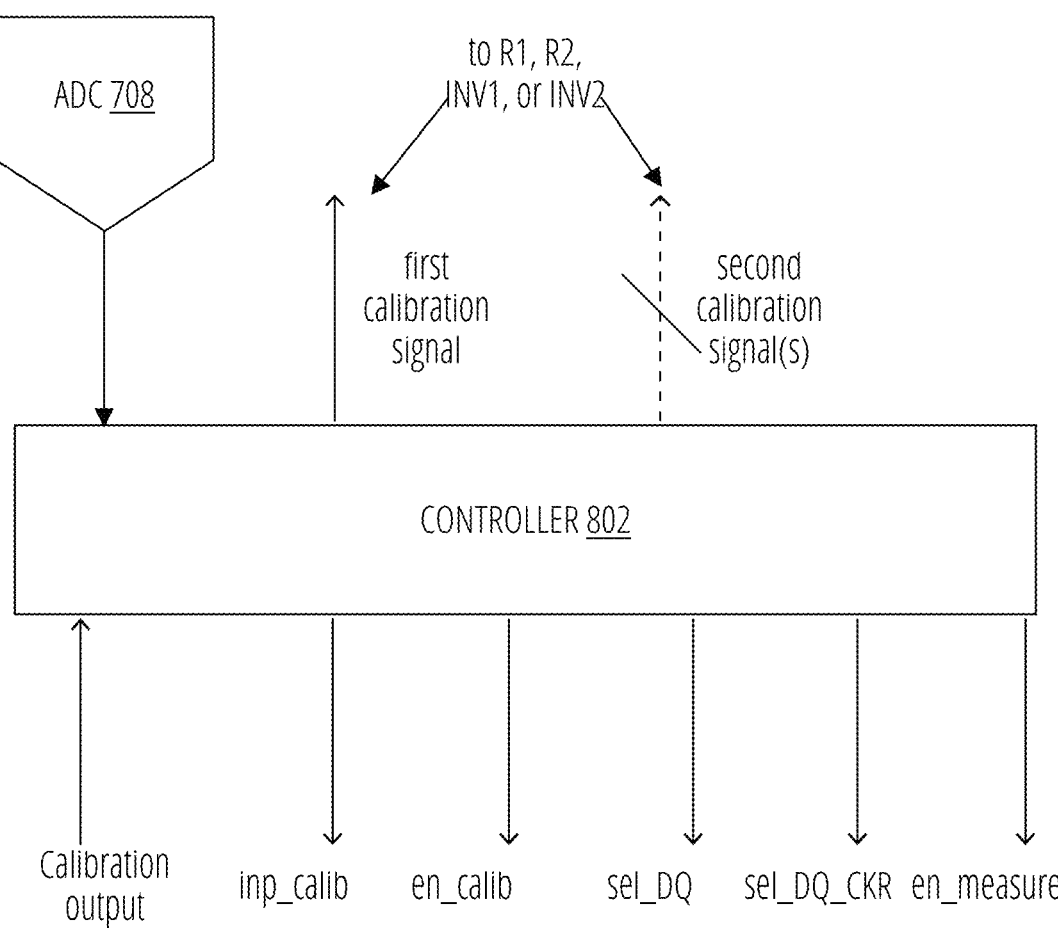
FIG. 8 depicts a controller sending signals to a calibration system, according to one embodiment.

FIG. 8 depicts a controller 802 sending signals to a calibration system 700, according to one embodiment. The controller 802 may include processing logic including software, hardware, firmware, or a combination thereof. The processing logic may be operatively coupled to memory (e.g., one or more memory storage devices or components) storing instructions that, when performed by the processing logic, cause at least one receiver device 120 be calibrated (e.g., synchronized) to a clock differential pair. In at least one embodiment, the processing logic may include one or more digital signal processing (DSP) blocks. In some embodiments, the controller 802 may perform the operations of the method 900 as described in FIG. 9.

As illustrated, the controller 802 may send various signals to the calibration system 500 and receive at least one signal from the calibration system 500. In some embodiments, the controller 802 may send signals inp_calib and en_calib to the calibration enabling circuit 302 (as illustrated in FIG. 3). The controller 602 may also send signal sel_DQ to the MUX 526, signal sel_DQ_CKR to the MUX 706, and signal en_measure to the switch coupling the CKR 704 to the MUX 706 (as illustrated in FIG. 7). In one embodiment, each of these signals may be sent to the calibration system according to the method 900 described in FIG. 9. In another embodiment, each of these signals may be sent to the calibration system according to a different method or process of calibrating RX(s) to a differential clock pair.

The controller 802 may receive digitized samples of $CKR_{in}$ or the selected $B_{PAD}$ from the ADC 708. For each sampled signal, the controller 802 may determine a trough (minimal) voltage level, a peak (maximum) voltage level, or both. Based on these voltage levels, as described above, the controller 802 may send or modify a first calibration signal to one of R1, R2, INV1, or INV2. The first calibration signal may cause the resistance of one of R1 or R2 to adjusted, or the on-resistance of one of INV1 or INV2 to be adjusted. By sending or modifying the first calibration signal, the controller 602 may cause a first ratio between resistances of R1 and R2 to change or a second ratio between on-resistances of INV1 and INV2 to change. In at least one embodiment, second calibration signal(s) may also be sent to the remaining of R1, R2, INV1, or INV2 that operate similarly to the first calibration signal. Sending or modifying these calibration signal(s) may cause the peak-to-peak amplitude of the selected $B_{PAD}$ to converge to the peak-to-peak amplitude of $CKR_{in}$. These calibration signal(s) may be iteratively sent or modified until the peak-to-peak amplitude of the selected $B_{PAD}$ is approximately equal to the peak-to-peak amplitude of $CKR_{in}$, or the respective peaks and troughs of the selected $B_{PAD}$ and $CKR_{in}$ are approximately equal.

Figure 9:
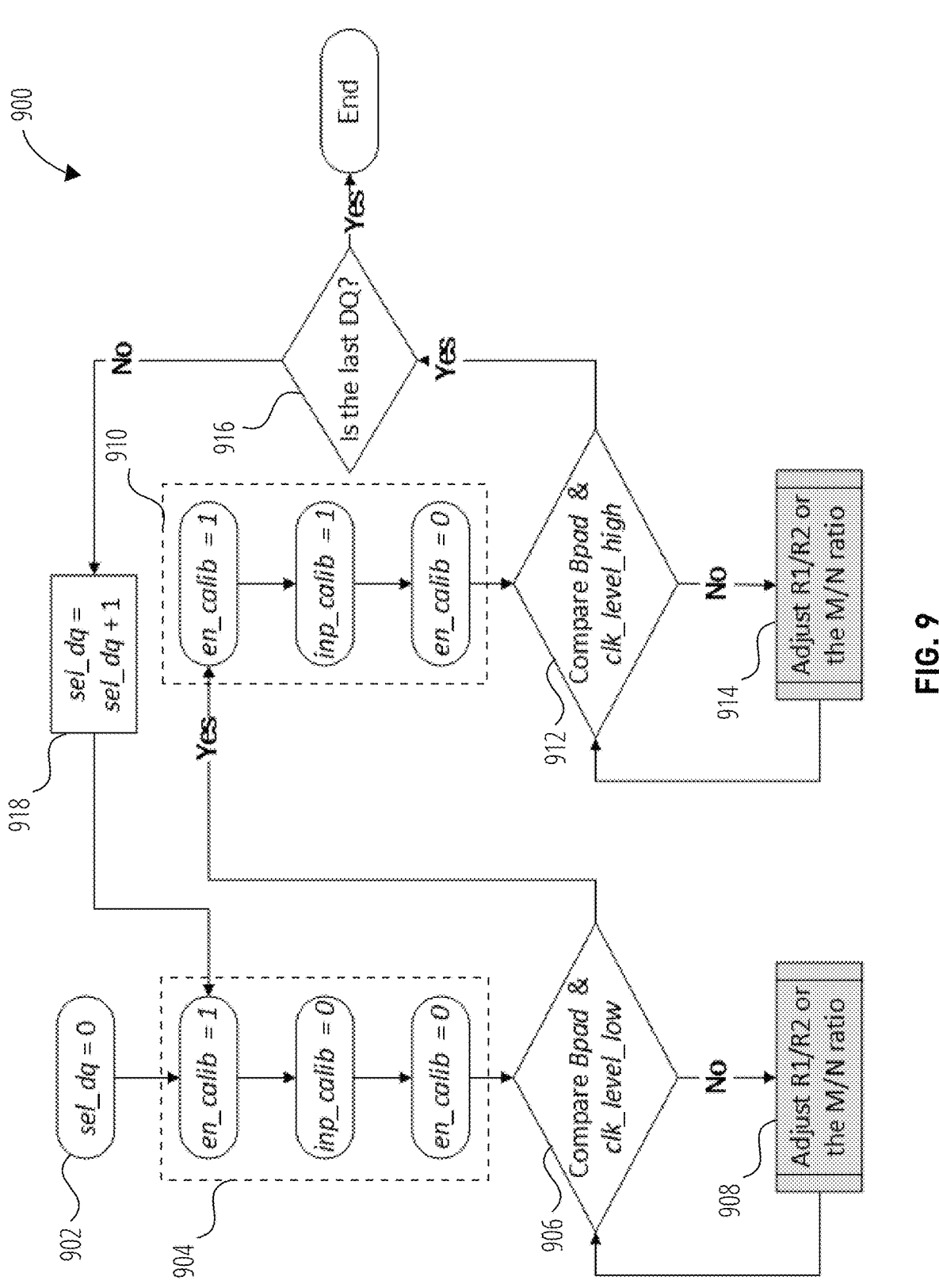
FIG. 9 illustrates a method of operating a calibration system, according to one embodiment.

FIG. 9 illustrates a method 900 of operating a calibration system, according to one embodiment. The method 900 may be performed by processing logic that may comprise hardware (e.g., circuitry, dedicated logic, programmable logic, microcode, etc.), software (e.g., instructions run on one or more processing devices), firmware, or a combination thereof. In some embodiments, the method 900 may be performed by a controller, such as the controller 602 as described in FIG. 6 or the controller 802 as described in FIG. 8. The method 900 can be performed by other devices described herein.

At block 902, the processing logic may initialize calibration of multiple receiver devices (RXs) (e.g., RXs 120) of a communication system. To initialize this calibration, the processing logic may start by calibrating a first RX, which first RX may be selected by setting a signal sel_dq (i.e., sel_DQ sent to MUX 526 in FIGS. 5 and 7) equal to zero (0). Once this first RX has been initialized, the signal sel_dq may be incremented to one (1) at block 918. The signal sel_dq may be incremented at block 918 until each RX of the communication system has been calibrated to the clock signal(s).

At block 904, the processing logic initializes a calibration enabling circuit (e.g., calibration enabling circuit 302 of FIG. 3) to set $B_{PAD}$ equal to a trough (minimum) voltage level permitted by the characteristics of the selected RX. These characteristics may include a first ratio between resistances of resistors (e.g., R1, R2) or a second ratio between on-resistances of inverters (e.g., INV1, INV2). When initialized, the calibration enabling circuit can induce an input signal (e.g., $B_{PAD}$) of the RX to reach the trough voltage level permitted based on characteristics of the RX. To do so, the processing logic may first cause a signal en_calib=1 and a signal inp_calib=0. In at least one embodiment, inp_calib is set to 0 before en_calib is set to 1. The signal en_calib may control the switch of calibration enabling circuit 302 in FIG. 3. By causing en_calib=1, the processing logic may cause this switch to be closed (e.g., conducting, on). The signal inp_calib may indicate which set of data (of multiple sets of data) is to be sent to the input pad of the RX of FIG. 3. In some embodiments, by causing inp_calib=0, the processing logic causes a first data set to be loaded into a buffer of the calibration enabling circuit. The first data set may be zeroes (0s). In at least one embodiment, by causing inp_calib=0 and en_calib=1, the processing logic causes a DC signal of approximately zero (0) volts to be sent to the input of the RX. Afterwards, the processing logic may cause the signal en_calib to be set to 0 (e.g., en_calib=0). In at least one embodiment, by setting en_calib=0, the processing logic causes the switch of the calibration enabling circuit to open (e.g., cut-off, off). A short time after opening the switch (e.g., as illustrated in FIG. 3, the switch is coupled to the input of the RX 120) by setting en_calib to 0, the voltage level of the input signal (e.g., $B_{PAD}$) may be equal to the trough (or minimum) voltage level permitted based on the characteristics of the RX. In some embodiments, the RX may include a feedback loop that will stabilize a short amount of time after the switch is opened (e.g., because the calibration enabling circuit is no longer influencing the voltage level of the input signal).

Notwithstanding the above description of how the processing logic causes $B_{PAD}$ to be equal to the trough voltage level permitted by the characteristics of the RX, any suitable manner of providing a signal with a predetermined voltage level may be used. For example, a near-zero voltage level may be provided to the input of the RX via a digital-to-analog converter (DAC), switching regulators, a programmable voltage source, switched-capacitor circuits, a MUX with a selectable near-zero voltage input, relays, or any combination thereof.

At block 906, the processing logic may compare $B_{PAD}$ to a trough voltage level (e.g., clk_level_low) of forwarded clock(s). In one embodiment, $B_{PAD}$ is compared to the trough voltage level of a forwarded differential clock pair. In this embodiment, $B_{PAD}$ may be compared to the trough voltage level of the forwarded differential clock pair using the output of a comparator, such as the comparator 330 as described in FIGS. 3 and 5. In another embodiment, $B_{PAD}$ is compared to the trough voltage level of a forwarded single-ended clock signal. Here, $B_{PAD}$ may be compared to the trough voltage level of the forwarded single-ended clock signal by sampling, using an ADC (e.g., ADC 708) to sample both $B_{PAD}$ and the clock signal, and then comparing the minimum sampled digital voltage values (e.g., trough voltage level of $B_{PAD}$ and trough voltage level of the clock signal) of both signals. If the minimum sampled digital voltages of $B_{PAD}$ and the clock signal(s) are approximately equal, the processing logic may initialize the calibration enabling circuit to set $B_{PAD}$ equal to a peak (maximum) voltage value permitted by the characteristics of the selected RX at block 910. Whether the minimum sampled digital voltages of $B_{PAD}$ and the clock signal(s) are "approximately equal" may depend on limitations or characteristics of the communication system. One such limitation of the communication system may be a maximum amount of skew before the clock and data signal are considered unsynchronized. In at least one embodiment, the minimum sampled digital voltages of $B_{PAD}$ and the clock signal(s) are "approximately equal" if they are within several tens of millivolts (e.g., 20 mV, 30 mV, 40 mV, or the like) of each other.

At block 908, if the trough voltage levels of $B_{PAD}$ and the clock signal(s) are not approximately equal, the processing logic may cause the first ratio between resistances of resistors of RX (R1, R2) or the second ratio between on-resistances of inverters of RX (INV1, INV2) to be adjusted, as has been described above in FIGS. 1-8. Once adjusted, the processing logic may compare the trough voltage level of the clock signal(s) to the updated $B_{PAD}$ trough voltage level (e.g., third voltage level) at block 906. The ratio may iteratively be adjusted until these trough voltage levels are approximately equal. This iterative adjustment is illustrated by the feedback loop illustrated between block 906 and block 908.

At block 910, the processing logic initializes the calibration enabling circuit (e.g., calibration enabling circuit 302 of FIG. 3) to set $B_{PAD}$ equal to a peak (maximum) voltage level permitted by the characteristics of the selected RX. When initialized, the calibration enabling circuit can induce $B_{PAD}$ of the RX to reach the peak voltage level permitted based on characteristics (e.g., the first or second ratio as described above) of the RX. To do so, the processing logic first may cause the signal en_calib=1 and a signal inp_calib=0. In at least one embodiment, inp_calib is set to 0 before en_calib is set to 1. By causing en_calib=1, the processing logic may cause this switch to be closed (e.g., conducting, on). In some embodiments, by causing inp_calib=1, the processing logic causes a second data set to be loaded into the buffer of the calibration enabling circuit. The second data set may be ones (1s), or high values. In at least one embodiment, by causing inp_calib=1 and en_calib=1, the processing logic causes a non-zero DC signal greater than a trigger point (e.g., a threshold) to be sent to the RX. The trigger point may be a predetermined voltage level at which the signal is interpreted as transitioning from a logical LOW (0) to a logical HIGH (1), or vice versa. Afterwards, the processing logic may cause the signal en_calib to be set to zero (e.g., en_calib=0). In at least one embodiment, by setting en_calib=0, the processing logic causes the switch of the calibration enabling circuit to open (e.g., cutoff, off). A short time after opening the switch (e.g., as illustrated in FIG. 3, the switch is coupled to the input of the RX 120) by setting en_calib to 0, the voltage level of the input signal (e.g., $B_{PAD}$) may be equal to the peak (or maximum) voltage level permitted based on the characteristics of the RX. In some embodiments, the RX may include a feedback loop that will stabilize a short amount of time after the switch is opened (e.g., because the calibration enabling circuit is no longer influencing the voltage level of the input signal).

Notwithstanding the above description of how the processing logic causes $B_{PAD}$ to be equal to the peak voltage level permitted by the characteristics of the RX, any suitable manner of providing a signal with a predetermined voltage level may be used. For example, a non-zero voltage level above the trigger point may be provided to the input of the RX via a digital-to-analog converter (DAC), switching regulators, a programmable voltage source, switched-capacitor circuits, a MUX with a selectable near-zero voltage input, relays, or any combination thereof.

At block 912, the processing logic may compare $B_{PAD}$ to a peak voltage level (e.g., clk_level_low) of forwarded clock(s). In one embodiment, $B_{PAD}$ is compared to the peak voltage level of a forwarded differential clock pair. In this embodiment, $B_{PAD}$ may be compared to the peak voltage level of the forwarded differential clock pair using the output of a comparator, such as the comparator 330 is described in FIGS. 3 and 5. In another embodiment, $B_{PAD}$ is compared to the peak voltage level of a forwarded single-ended clock signal. Here, $B_{PAD}$ may be compared to the peak voltage level of the forwarded single-ended clock signal by sampling, using an ADC (e.g., ADC 708) to sample both $B_{PAD}$ and the clock signal, and then comparing the maximum sampled digital voltage values (e.g., peak voltage level of $B_{PAD}$ and peak voltage level of the clock signal) of both signals. If the maximum sampled digital voltages of $B_{PAD}$ and the clock signal(s) are approximately equal, the processing logic may determine whether the selected RX is a last RX in the communication system at block 916.

At block 914, if the peak voltage levels of $B_{PAD}$ and the clock signal(s) are not approximately equal, the processing logic may cause the first ratio between resistances of resistors of RX or the second ratio between on-resistances of inverters of RX to be adjusted, as has been described above in FIGS. 1-8. Once adjusted, the processing logic may compare the peak voltage level of the clock signal(s) to the updated $B_{PAD}$ peak voltage level (e.g., third voltage level) at block 912. The ratio may iteratively be adjusted until these peak voltage levels are approximately equal. This iterative adjustment is illustrated by the feedback loop illustrated between block 912 and block 914.

At block 916, the processing logic may determine whether the selected RX is the last RX in the communication system. If so, the method 900 ends, as each RX of the communication system has been calibrated or synchronized to the clock signal(s). If not, the processing logic may set sel_dq=sel_dq+1 at block 918 to select a different RX and repeat the calibration process for the newly-selected RX at block 904.

FIG. 10 illustrates a method 1000 of synchronizing a data signal and a clock signal, according to one embodiment. The method 1000 may be performed by processing logic that may comprise hardware (e.g., circuitry, dedicated logic, programmable logic, microcode, etc.), software (e.g., instructions run on one or more processing devices), firmware, or a combination thereof. In some embodiments, the method 1000 may be performed by a controller, such as the controller 602 as described in FIG. 6 or the controller 802 as described in FIG. 8. The method 1000 may also be performed by other processing logic operatively coupled to the calibration system 500 as described in FIG. 5. The method 1000 can be performed by other devices described herein.

At block 1002, the processing logic may receive, by a receiver circuit, a first peak voltage corresponding to a data signal. The receiver circuit may include a first inverter, a second inverter coupled in series to the first inverter, a first feedback resistor coupled between an input of the first inverter and an output of the second inverter, and a second feedback resistor coupled between an input of the first inverter and an input of the second inverter.

At block 1004, the processing logic may determine, by peak detection logic, a second peak voltage corresponding to a clock signal.

At block 1006, the processing logic may receive, by a comparator, the first and second peak voltages. Based on these first and second peak voltages, the comparator may output an indication of synchronization between the data signal and the clock signal.

At block 1008, the processing logic may adjust, using the indication, a parameter of the receiver circuit to synchronize the data signal and the clock signal.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of the term "approximately" and similar referents in the context of describing disclosed embodiments are to be construed, unless stated otherwise, to match the constraints or requirements of communication system(s) described herein. In at least one embodiment, the term "approximately" may be defined as within 10%. In another embodiment, the term "approximately" may be defined as within 5%. In another embodiment, the term "approximately" may be defined as within 1%. In other embodiments, the term "approximately" may be defined as a different percentage or number.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulates and/or transforms data represented as physical, such as electronic, quantities within computing system's registers and/or memories into other data similarly represented as physical quantities within computing system's memories, registers or other such information storage, transmission or display devices.

In a similar manner, terms such as "processor," "controller," or "processing logic" may refer (at least partially) to any device or portion of a device that processes electronic data from registers and/or memory and transform that electronic data into other electronic data that may be stored in registers and/or memory. As a non-limiting example, a "processor" may be a network device. "Processing logic" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or in parallel. In at least one embodiment, the terms "system" and "method" are used herein interchangeably insofar as the system may embody one or more methods, and methods may be considered a system.

In the present disclosure, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A circuit comprising:
a receiver circuit configured to receive a data signal, the receiver circuit comprising a first inverter, a second inverter coupled in series to the first inverter, a first feedback resistor coupled between an input of the first inverter and an output of the second inverter, and a second feedback resistor coupled between the input of the first inverter and an input of the second inverter; and
a clock-to-data synchronization circuit configured to receive the data signal and a clock signal, wherein the clock-to-data synchronization circuit is configured to determine an indication of synchronization between the data signal and the clock signal and adjust, using the indication, a parameter of the receiver circuit to synchronize the data signal and the clock signal.

2. The circuit of claim 1, wherein the clock-to-data synchronization circuit comprises a controller configured to adjust, using the indication, the parameter of the receiver circuit to converge a first peak-to-peak amplitude of the data signal toward a second peak-to-peak amplitude of the clock signal.

3. The circuit of claim 1, wherein the clock-to-data synchronization circuit further comprises:
peak detection logic configured to receive the clock signal and output one or more peak voltage levels of the clock signal; and
a comparator comprising a first input coupled to the input of the first inverter and a second input coupled to the peak detection logic, the comparator configured to output the indication of synchronization between the data signal and the clock signal.

4. The circuit of claim 3, wherein the clock-to-data synchronization circuit further comprises a multiplexer coupled between the peak detection logic and the comparator, wherein the multiplexer comprises a first input coupled to the peak detection logic configured to receive a minimum peak voltage level of the clock signal, a second input coupled to the peak detection logic configured to receive a maximum peak voltage level of the clock signal, and an output coupled to the second input of the comparator.

5. The circuit of claim 3, wherein the clock-to-data synchronization circuit comprises a multiplexer coupled between the input of the first inverter and the comparator, wherein the multiplexer comprises a first input coupled to the input of the first inverter, a second input coupled to a second receiver circuit, and an output coupled to the first input of the comparator.

6. The circuit of claim 1, wherein to adjust the parameter of the receiver circuit, the clock-to-data synchronization circuit is configured to adjust an on-resistance of at least one of the first or second inverters.

7. The circuit of claim 6, wherein adjusting the on-resistance of at least one of the first or second inverters comprises enabling or disabling a transistor, and wherein one of the first or second inverters comprises the transistor.

8. The circuit of claim 1, wherein to adjust the parameter of the receiver circuit, the clock-to-data synchronization circuit is configured to adjust a resistance of at least one of the first or second feedback resistors.

9. A communication device comprising:
a receiver comprising:
a first inverter comprising an input to receive a data signal; and
a first resistor coupled in parallel to the first inverter;
peak detection logic configured to receive a clock signal;

a comparator comprising a first input coupled to the input of the first inverter and a second input coupled to the peak detection logic;
memory; and
a controller operatively coupled to the memory, wherein upon executing instructions stored within the memory, the controller is configured to:
receive a first indication from the comparator based on a first voltage level received at the first input of the comparator and a second voltage level received at the second input of the comparator; and
cause, based on the first indication, at least one of a first resistance of the first resistor or a first on-resistance of the first inverter to be adjusted.

10. The communication device of claim 9, wherein the controller is further configured to receive, after causing at least one of the first resistance or the first on-resistance to be adjusted, a second indication from the comparator based on a third voltage level received at the first input and the second voltage level, wherein the first and third voltage levels are different, and wherein a first difference between the first and second voltage levels is greater than a second difference between the second and third voltage levels.

11. The communication device of claim 9, wherein the receiver further comprises a second inverter coupled in series with the first inverter, wherein at least one of the first on-resistance or a second on-resistance of the second inverter is adjustable, and wherein causing at least one of the first or second on-resistances to be adjusted modifies a peak-to-peak amplitude of the data signal.

12. The communication device of claim 11, wherein to cause at least one of the first or second on-resistances to be adjusted, the controller is configured to enable or disable a transistor, wherein one of the first or second inverters comprises the transistor.

13. The communication device of claim 9, wherein the receiver further comprises:
a second inverter coupled in series with the first inverter; and
a second resistor coupled in parallel with the first and second inverters, wherein at least one of the first resistance or a second resistance of the second resistor is adjustable, and wherein causing at least one of the first or second resistances to be adjusted modifies a peak-to-peak amplitude of the data signal.

14. The communication device of claim 9, wherein the first voltage level is a maximum or minimum peak voltage level of the data signal, and wherein the second voltage level is a maximum or minimum peak voltage level of the clock signal.

15. The communication device of claim 9, wherein the communication device further comprises a multiplexer coupled between the input of the first inverter and the comparator, and a second receiver coupled to the comparator by the multiplexer, wherein the controller is further configured to:
receive, after causing the first resistance or the first on-resistance to be adjusted, a second indication from the comparator based on a third voltage level received at the first input from the second receiver and the second voltage level; and
cause a second resistance of a second resistor or a second on-resistance of a second inverter of the second receiver to be adjusted.

16. A method comprising:
receiving, by a receiver circuit, a first peak voltage corresponding to a data signal, wherein the receiver circuit comprises a first inverter, a second inverter coupled in series to the first inverter, a first feedback resistor coupled between an input of the first inverter and an output of the second inverter, and a second feedback resistor coupled between the input of the first inverter and an input of the second inverter;

determining, by peak detection logic, a second peak voltage corresponding to a clock signal;

receiving, by a comparator, the first and second peak voltages, wherein the comparator is configured to output an indication of synchronization between the data signal and the clock signal; and adjusting, using the indication, a parameter of the receiver circuit to synchronize the data signal and the clock signal.

17. The method of claim 16, further comprising iteratively adjusting the parameter of the receiver circuit to converge a first peak-to-peak amplitude of the data signal toward a second peak-to-peak amplitude of the clock signal.

18. The method of claim 16, wherein adjusting the parameter of the receiver circuit comprises adjusting an on-resistance of at least one of the first or second inverters.

19. The method of claim 18, wherein adjusting the on-resistance of at least one of the first or second inverters comprises enabling or disabling a transistor, and wherein one of the first or second inverters comprises the transistor.

20. The method of claim 16, wherein adjusting the parameter of the receiver circuit comprises adjusting a resistance of at least one of the first or second feedback resistors.

* * * * *